(12) United States Patent
Smith

(10) Patent No.: US 6,957,383 B1
(45) Date of Patent: Oct. 18, 2005

(54) SYSTEM AND METHOD FOR DYNAMICALLY UPDATING A SITE MAP AND TABLE OF CONTENTS FOR SITE CONTENT CHANGES

(75) Inventor: Mark D. Smith, Binghamton, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/472,677

(22) Filed: Dec. 27, 1999

(51) Int. Cl.[7] .......................... G06F 15/00; G06F 7/00; G06F 12/00
(52) U.S. Cl. .................. 715/501.1; 715/513; 715/514; 715/517; 707/100; 707/102; 707/104.1; 707/200
(58) Field of Search ................... 715/501.1, 513, 715/514, 518; 345/760, 853, 854, 855; 707/100, 707/102, 104.1, 200

(56) References Cited

U.S. PATENT DOCUMENTS

| | | | |
|---|---|---|---|
| 5,606,669 A * | 2/1997 | Bertin et al. | 709/223 |
| 5,708,825 A * | 1/1998 | Sotomayor | 715/501.1 |
| 5,778,367 A | 7/1998 | Wesinger, Jr. et al. | 707/10 |
| 5,790,121 A | 8/1998 | Sklar et al. | 345/356 |
| 5,870,559 A | 2/1999 | Leshem et al. | 395/200.54 |
| 5,878,421 A * | 3/1999 | Ferrel et al. | 707/100 |
| 5,895,470 A * | 4/1999 | Pirolli et al. | 707/102 |
| 5,920,864 A * | 7/1999 | Zhao | 707/10 |
| 5,935,210 A * | 8/1999 | Stark | 709/224 |
| 5,943,670 A * | 8/1999 | Prager | 707/5 |
| 6,035,330 A * | 3/2000 | Astiz et al. | 709/218 |
| 6,038,610 A * | 3/2000 | Belfiore et al. | 709/310 |
| 6,195,696 B1 * | 2/2001 | Baber et al. | 709/223 |
| 6,199,098 B1 * | 3/2001 | Jones et al. | 709/203 |
| 6,237,006 B1 * | 5/2001 | Weinberg et al. | 707/103 R |
| 6,360,235 B1 * | 3/2002 | Tilt et al. | 715/501.1 |
| 6,411,999 B1 * | 6/2002 | Tinkler | 709/224 |
| 6,493,717 B1 * | 12/2002 | Junkin | 707/102 |

FOREIGN PATENT DOCUMENTS

| | | | | |
|---|---|---|---|---|
| GB | 2328297 A | * | 2/1999 | G06F 17/30 |
| JP | 10171703 | | 12/1996 | |

OTHER PUBLICATIONS

Kerry A. Lehto et al., Introducing Microsoft FrontPage97 (Microsoft Press: 1997), pp. 144-158.*

Takashi Sakairi, "A Site Map for Visualizing Both a Web Site's Structure and Keywords," Systems, Man, and Cybernetics, 1999 IEEE Conference Proceedings (Oct. 12-15, 1999), vol. 4, pp. 200-205.*

C.J. Pilgrim et al., "Designing WWW Site Map Systems," Database and Expert Systems Applications, 1999 Proceedings (Sep. 1-3, 1999), pp. 253-258.*

(Continued)

*Primary Examiner*—Joseph Feild
*Assistant Examiner*—Chau Nguyen
(74) *Attorney, Agent, or Firm*—John R. Pivnichny; Shelley M Beckstrand

(57) ABSTRACT

A web site is broken up into main topical content areas. Each area shows a list of content items that the user can link to, displayed using views. A site map and table of contents read these views to determine what the user should see. The site map is a high level category oriented view, and the table of contents is a more detailed view, getting lower level to content items. Each time the users requests the site map or table of contents, an agent is executed to "lookup" into the content views, giving the user the very latest content.

7 Claims, 7 Drawing Sheets

OTHER PUBLICATIONS

Steffen Klein, "Designing for Customer Interaction on the Web," IEEE Internet Computing (Jan.-Feb. 1999), pp. 32-35.*

"Look Ahead Filtering of Internet Content", IBM Technical Disclosure Bulletin, vol. 40, No. 12, Dec. 1997 p. 143.

"Change Tagging in Internet Documents", IBM Technical Disclosure Bulleting, vol. 40 No. 12 Dec. 1997, p. 153.

"Server Assist for Information Discovery on a Dynamic Web Site", Research Disclosure 416162, Dec. 1998, p. 1733.

"A Navigation Aid for Graph Visualization Tools: The Minimap Apparatus", Research Disclosure 408161, Apr. 1998, p. 476.

"A Process and Tools for Multi-Modal Authoring of Web Content", Research Disclosure 422123, Jun. 1999, p. 887-88.

"Visutal URLs for Browing an Dsearching Large Information Spaces", Research Disclosure 41392, Sep. 1998, p. 1238-39.

* cited by examiner

TOPICAL CONTENT AREA PAGE

SITE MAP PAGE

TABLE OF CONTENTS

SITE MAP FORM

TABLE OF CONTENTS FORM

SYSTEM AND METHOD FOR DYNAMICALLY UPDATING A SITE MAP AND TABLE OF CONTENTS FOR SITE CONTENT CHANGES

BACKGROUND OF THE INVENTION

1. Technical Field of the Invention

This invention pertains to web technology. More particularly, it relates to the preparation and display of web site maps and tables of contents dynamically updated to current content.

2. Background Art

In a very dynamic web site, such as a Lotus Domino web site, content is added and deleted almost daily, many times hourly. Domino views, or the like, for this content may be categorized by certain topical areas. Content within these topics are added or subtracted by a Content Editing Team. In such an environment, in may be desirable or required to keep a site map and table of contents updated to match the content. Heretofore, it has been required that the site map and table of contents be updated manually. Most, if not all, site maps that exist on web sites are manually updated, or are at such a high level that when content changes, the site map is still accurate since it does not show low level details.

It is an object of the invention to provide an improved site map and table of contents for a web site.

It is a further object of the invention to provide a system and method for providing dynamic updating of a web page site map and table of contents.

It is a further object of the invention to provide a system and method enabling a dynamically updated web page site map and table of contents to link directly with volatile content.

It is a further object of the invention to provide a system and a method enabling browser linking of site content to the site map and table of contents.

SUMMARY OF THE INVENTION

A web site is broken up into main topical content areas. Each area shows a list of content items that the user can link to, displayed using views. A site map and table of contents read these views to determine what the user should see. The site map is a high level category oriented view, and the table of contents is a more detailed view, getting lower level content items. Each time the user requests the site map or table of contents, an agent is executed to "lookup" into the content views, thereby displaying to the user the very latest content items.

In accordance with an aspect of the invention, there is provided a computer program product configured to be operable responsive to a request to view a site map and/or table of contents to look into the underlying content views to provide the latest content to the site map and/or table of contents.

Other features and advantages of this invention will become apparent from the following detailed description of the presently preferred embodiment of the invention, taken in conjunction with the accompanying drawings.

BEST MODE FOR CARRYING OUT THE INVENTION

Figure 1:
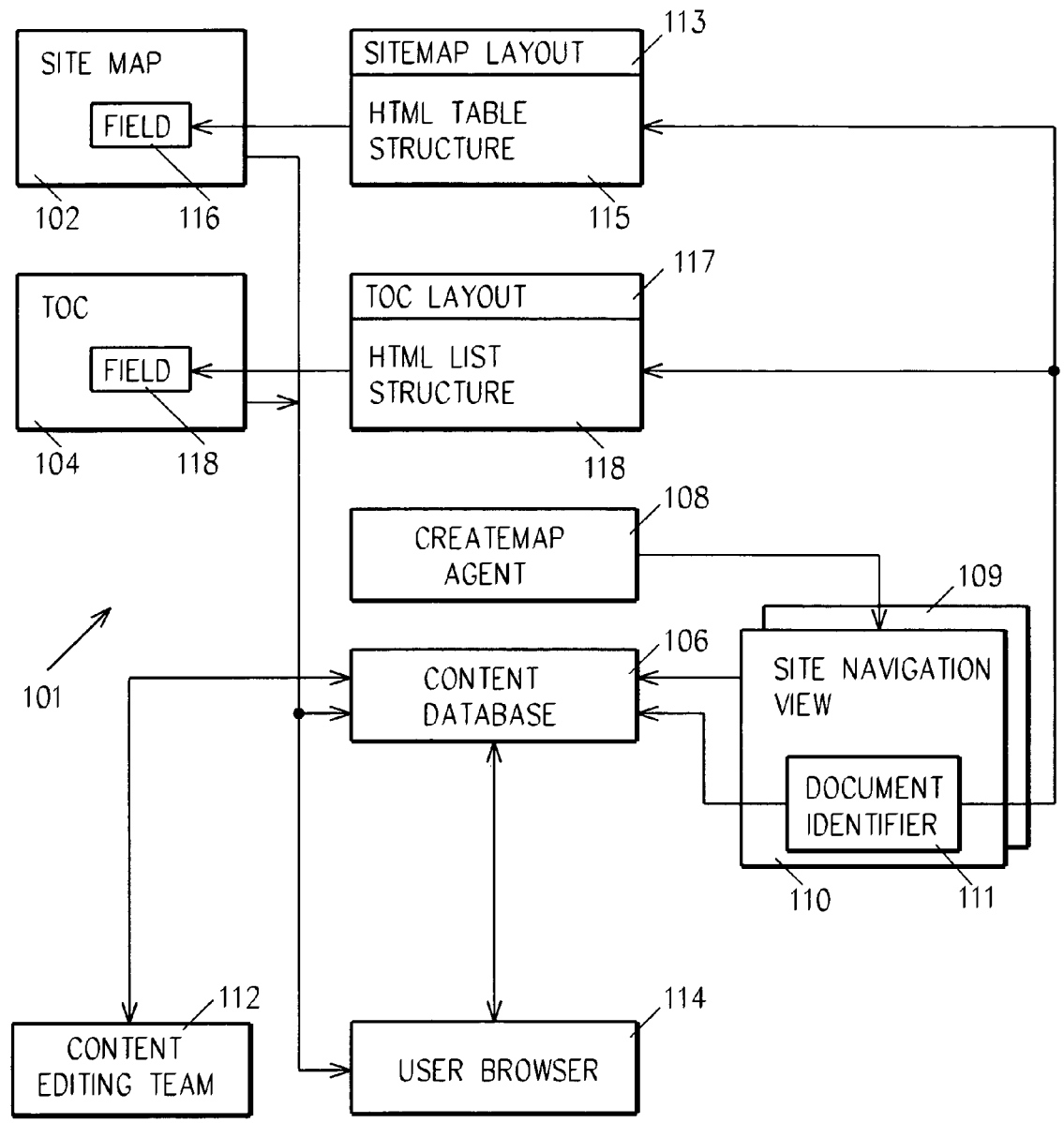
FIG. 1 is a high level system diagram of the system of the preferred embodiment of the invention for displaying a site view, such as a site map and/or table of contents.

Referring to FIG. 1, in accordance with the preferred embodiment of the invention, a site view, such as site map 102 or a table of contents 104, for a web site, such as a Lotus Domino web site, is linked directly to content 106 within the web site using a browser 114.

In a Lotus Domino web site 101 which is very dynamic, content is added to and deleted from a content database 106 almost daily, many times hourly. Domino views 109 for this content are categorized by certain topical areas. Content within these topics are added or subtracted by a Content Editing Team 112. In order to keep a site view or form, such as a Site Map 102 and Table of Contents 104, updated to match the content, and allow a user to link to those content items using a browser 114, a Domino agent 108 is provided to "lookup" into the views 109 that describe the main content areas 106 for new or changed content, and present the most current results to the user 114 in display of site map 116 or TOC 104.

Views 109 are sorted or categorized lists of documents, and are the entry points to data stored in a database 106. Every database 106 must have at least one view 109, though most have a plurality of views. A database is a container for data, logic, and design elements for an application. Design elements are building blocks used to create an application, and include pages, forms, outlines, navigators, views, folders, framesets, shared resources, and agents. Consequently, the agent 108 implementing the preferred embodiment of the present invention is a design. A site map 102 is an outline view.

Forms, like pages, display information. Forms also collect information. A form provides the structure for creating and displaying documents, and documents are the design element that store data in the database.

A field is the part of an application that collects data. Fields can be created on forms, subforms, or in layout regions. Each field stores a single type of information, and a field's field type defines the kind of information a field accepts, such as text, numbers, dates, or names. When a user, either in a client or a browser, creates a form, fills out the information in the fields, and saves the form, the data in the fields is stored in an individual document. The contents of the fields can then be displayed in documents and views or can be retrieved for use in formulas. When creating a field, the user defines the field name, field type, display options and field properties, computed or editable attribute, and formulas or scripts associated with the field. Items are field data.

Table 1 illustrates the format of a topical content area page.

TABLE 1

TOPICAL CONTENT AREA PAGE

| | | |
|---|---|---|
| 1 | Area Category 1 | |
| 2 | Area 1 content item 1 | |
| 3 | Area 1 content item 2 | |
| 4 | . . . | |
| 5 | Area 1 content item n | |
| 6 | Area Category 2 | Descriptive Page Text |
| 7 | Area 2 content item 1 | |
| 8 | Area 2 content item 2 | |
| 9 | . . . | |
| 10 | Area 2 content item n | |
| 11 | . . . | |
| 12 | Area Category n | |
| 13 | Area n content item 1 | |
| 14 | Area n content item 2 | |
| 15 | . . . | |
| 16 | Area n content item n | |

Figure 3:
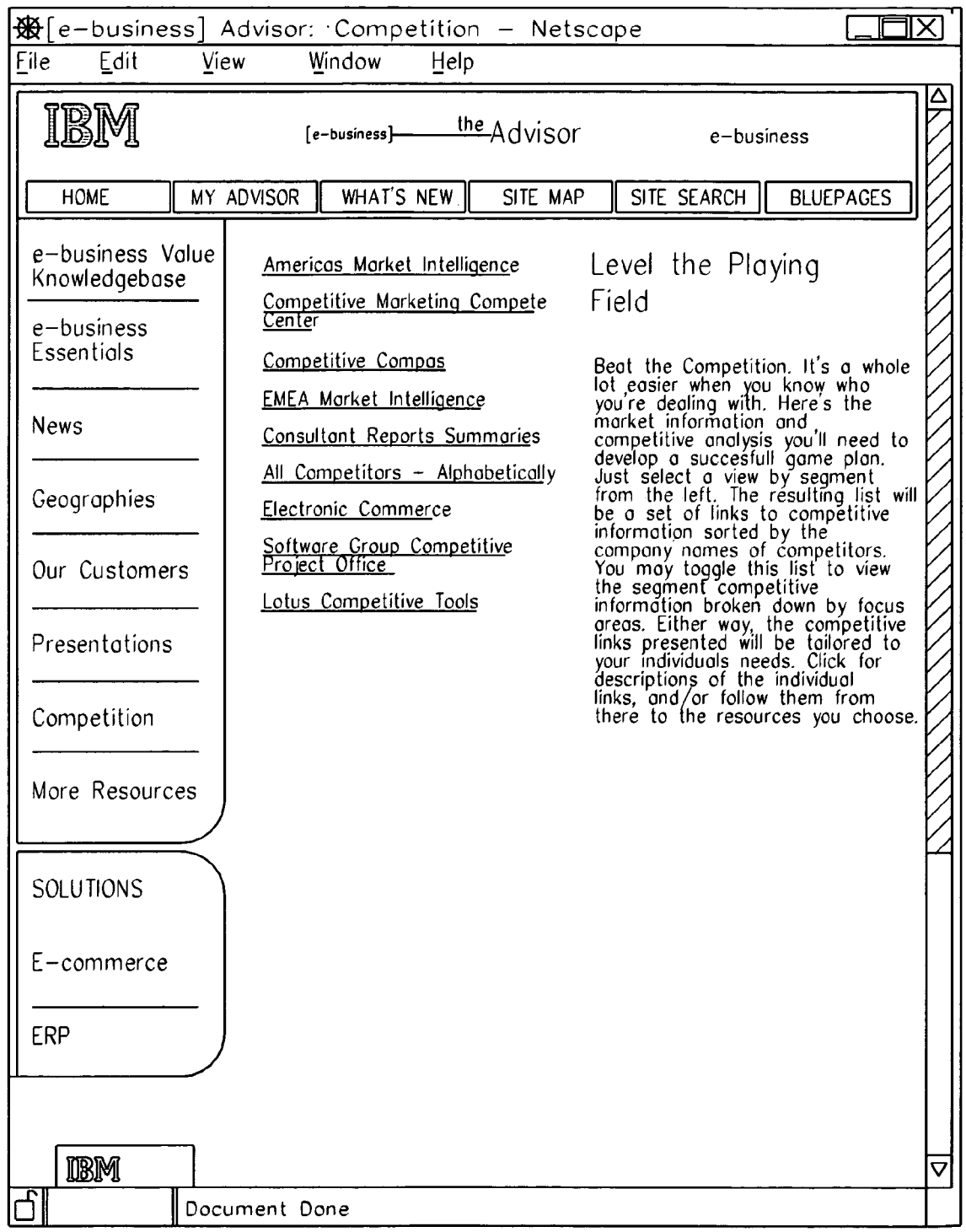
FIG. 3 is a screen capture representation of a topical content area page.

Referring to FIG. 3, a sample topical content area page is illustrated.

Table 2 illustrates the format of a site map 102.

TABLE 2

SITE MAP

| | | | |
|---|---|---|---|
| 1 | Content Area 1 | Content Area 2 . . . | Content Area N |
| 2 | Area 1 Category 1 | Area 2 Category 1 | Area n Category 1 |
| 3 | Area 1 Category 2 | Area 2 Category 2 | Area n Category 2 |
| 4 | . . . | . . . | . . . |
| 5 | Area 1 Category n | Area 2 Category n | Area n Category n |

Figure 4:
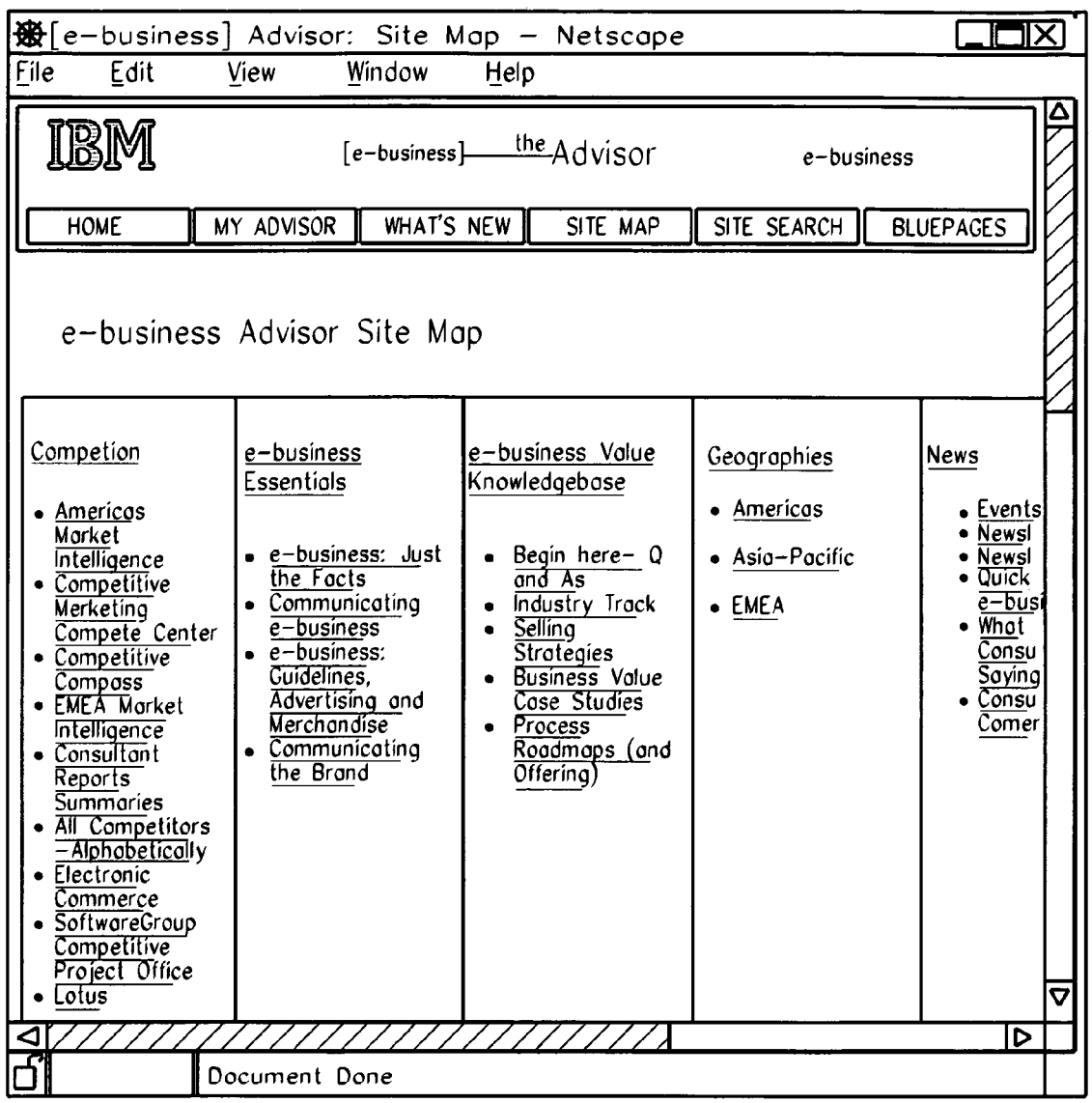
FIG. 4 is a screen capture representation of a site map page.

Referring to FIG. 4, a sample site map page 102 is illustrated.

Table 3 illustrates the format of a table of contents 104.

TABLE 3

TABLE OF CONTENTS

| | |
|---|---|
| 1 | Content Area 1 |
| 2 | Area 1 Category 1 |
| 3 | Area 1 content item 1 |
| 4 | Area 1 content item 2 |
| 5 | . . . |
| 6 | Area 1 content item n |
| 7 | . . . |
| 8 | Area 1 Category n |
| 9 | Area n content item 1 |
| 10 | Area n content item 2 |
| 11 | . . . |
| 12 | Area n content item n |
| 13 | Content Area 2 |
| 14 | Area 2 Category 1 |
| 15 | Area 2 content item 1 |
| 16 | Area 2 content item 2 |
| 17 | . . . |
| 18 | Area 2 content item n |
| 19 | . . . |
| 20 | Area 2 Category n |
| 21 | Area n content item 1 |
| 22 | Area n content item 2 |
| 23 | . . . |
| 24 | Area n content item n |
| 25 | . . . |
| 26 | Content Area N |
| 27 | Area N Category 1 |
| 28 | Area N content item 1 |
| 29 | Area N content item 2 |
| 30 | . . . |
| 31 | Area N content item n |
| 32 | . . . |
| 33 | Area N Category n |
| 34 | Area n content item 1 |
| 35 | Area n content item 2 |
| 36 | . . . |
| 37 | Area n content item n |
| 38 | |

Figure 5:
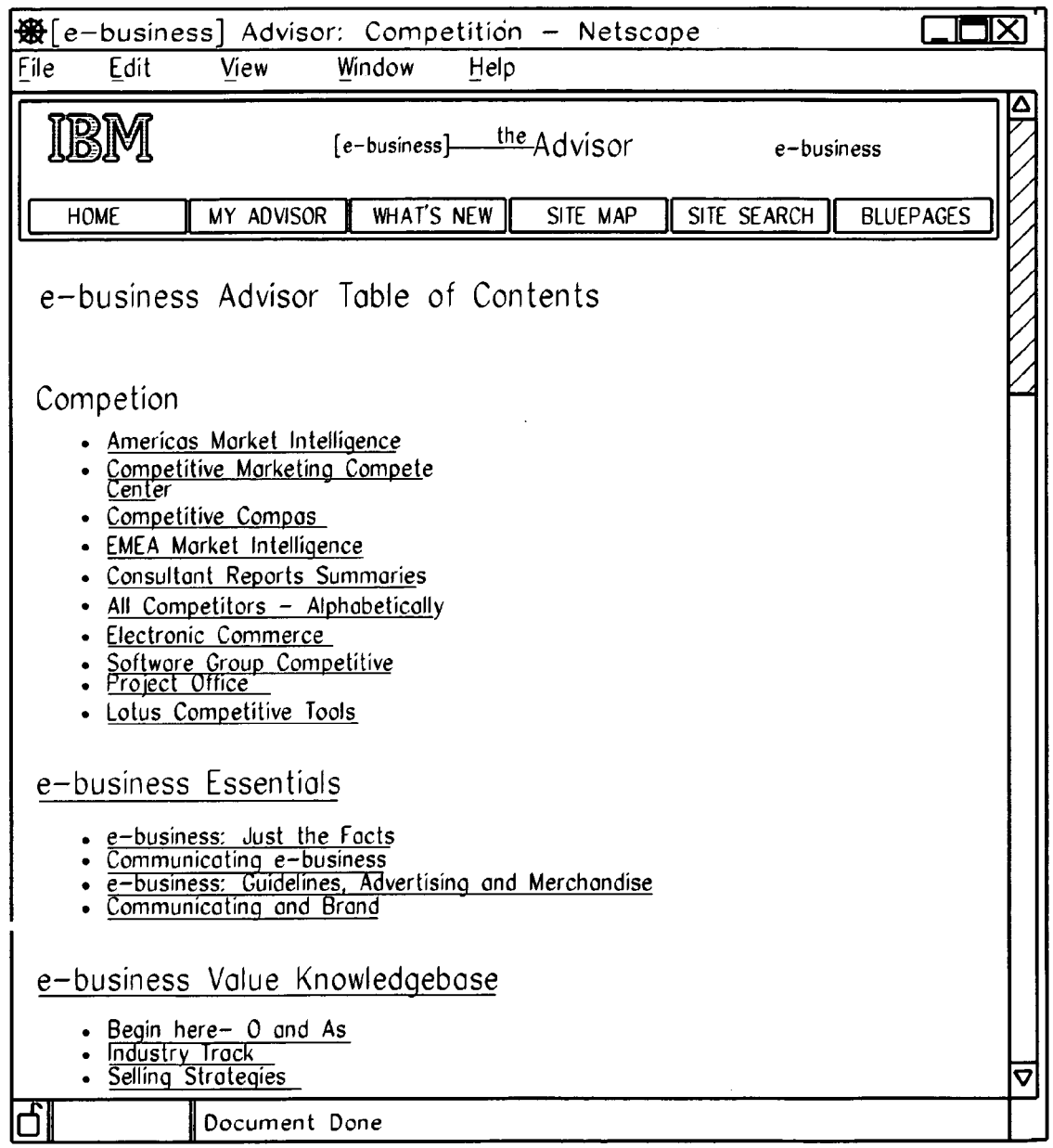
FIG. 5 is a screen capture representation of a table of contents page.

Referring to FIG. 5, a sample table of contents 104 is illustrated.

When ever an area category or content item is added to content database 106, or deleted, the lists of Tables 1–3 are immediately reflected to the user 114 whenever requested. For example, say in the "Competition" content area, "XYZ Consulting Group" is added. The next time the user looks at the Table of Contents 104, "XYZ Consulting Group" would appear there in "Competition"—no "design change" or manual update to the table of contents 104 is needed.

Figure 6:
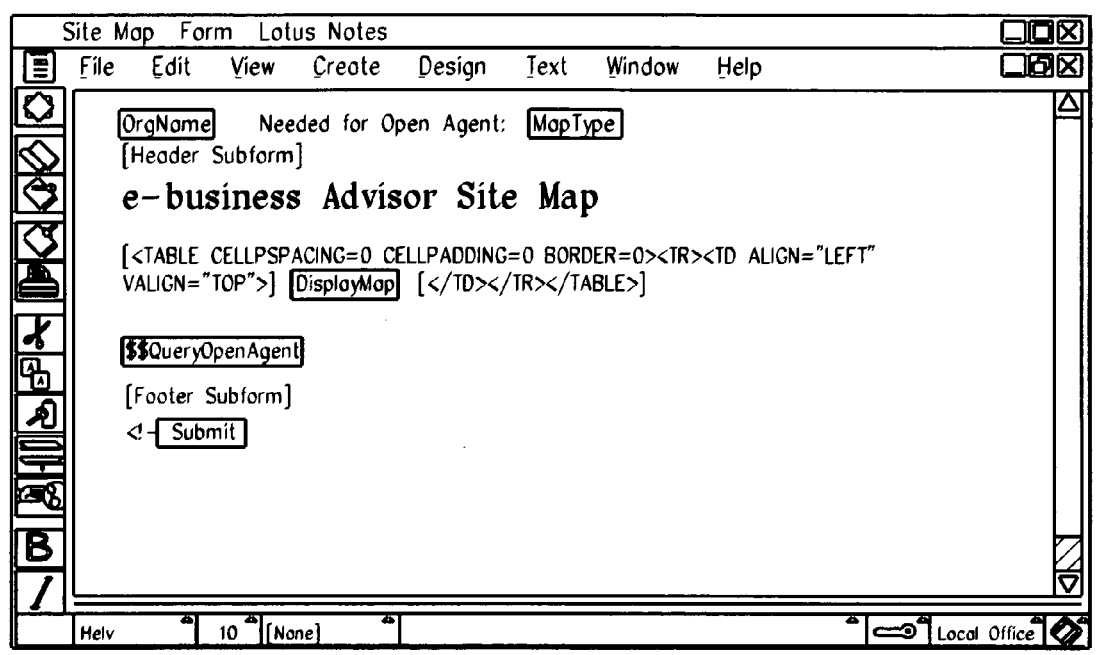
FIG. 6 is a screen capture representation of a site map form.
Figure 7:
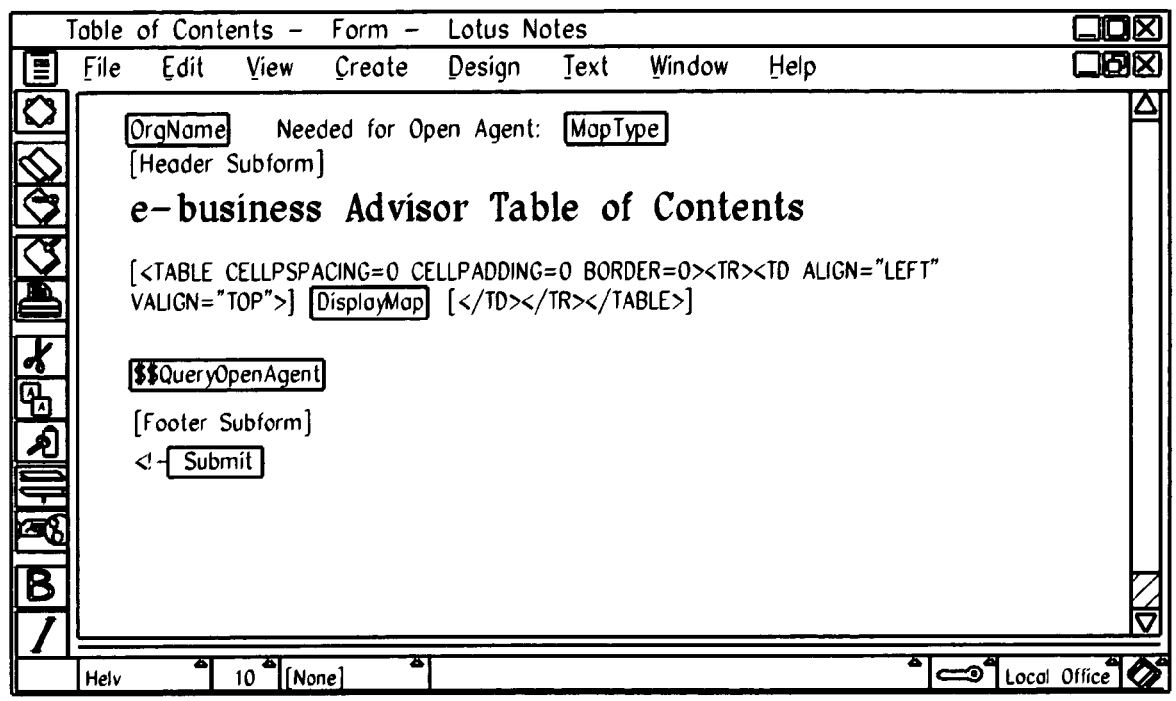
FIG. 7 is a screen capture representation of a table of contents form.

The site map 102 and TOC forms 104 are very similar. Referring to FIG. 6, a site map form 102 is illustrated. Referring to FIG. 7, a table of contents form 104 is illustrated.

Referring to FIG. 6, there are five basic elements to the structure of the site map form 102, as follows:
1. Layout structure, in tabular form, for the site map.
2. Title "Site Map".
3. Header and footer, pulled in from the web site.
4. Form type identifier, SiteMap (used by the CreateMap agent of Table 4, infra.
5. Data field 116, filled in by CreateMap agent 108 with site map data dynamically when the page 116 is requested by the user.

Referring to FIG. 7, there are five basic elements to the structure of the table of contents (TOC) form 104, as follows:
1. Layout structure, in a single column, for the TOC.
2. Title "Table of Contents"
3. Header and footer, pulled in from the web site.
4. Form type identifier, TOC (used by the CreateMap agent of Table 4, infra.
5. Data field 118, filled in by CreateMap agent 108 with TOC data dynamically when the page 104 is requested by the user.

Figure 2:
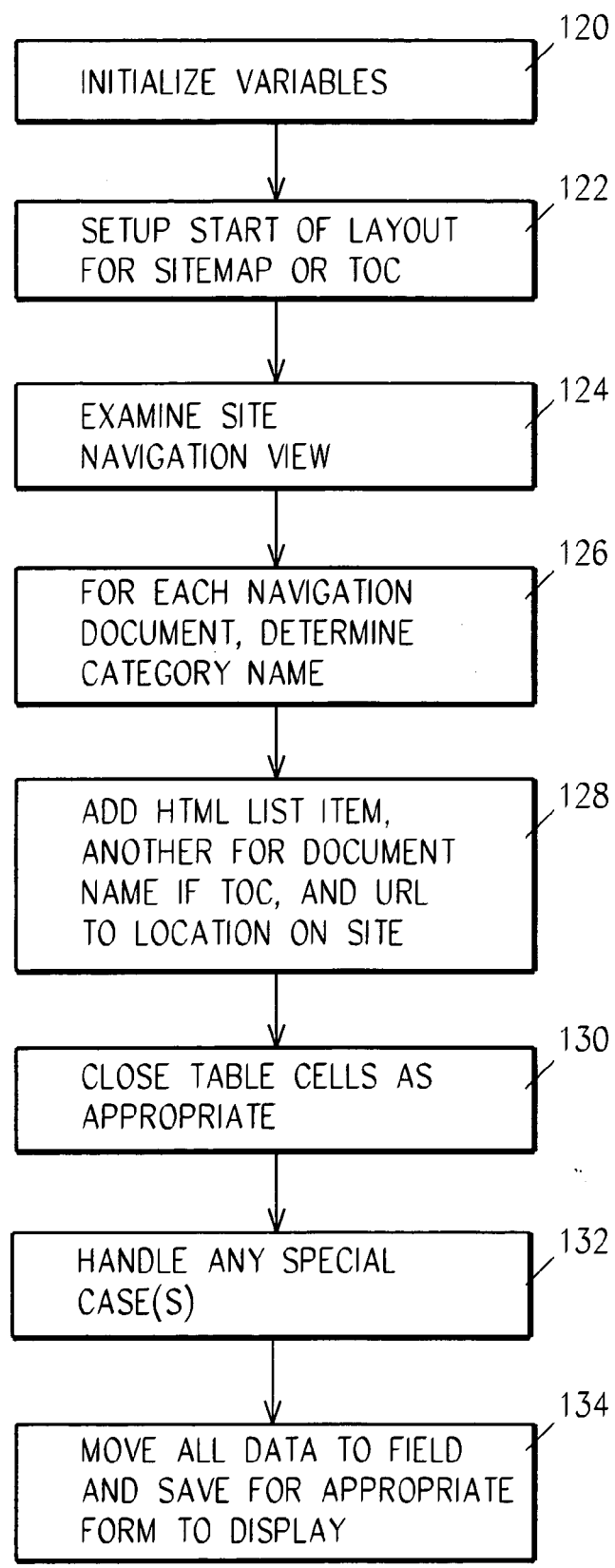
FIG. 2 is a flow diagram of the method of the preferred embodiment of the invention.

Referring to FIG. 2, in accordance with a preferred embodiment of the method of the invention, in step 120 the agent 108 to create the appropriate data for the site map 102 or table of contents (TOC) 104 first initializes variables that will be needed within the agent 108. In step 122, the agent 108 sets up the start of layout 113, 117 for either the site map or table of contents, depending on the form being request. If it is a site Map, an HTML table structure 115 is set up, and if it is a TOC, an HTML list structure 118 is set up. In step 124, the agent gets access to the navigation view 110 for the site. In step 126, for each navigation document 111 in the view, the agent 108 determines the appropriate category name and, in step 128, the agent adds an HTML list item 115 or 118 for the category and a URL to link within the site 101. Continuing in step 128, if this execution of the agent 108 is with respect to the TOC 104, a list item 118 is added for the document name and the URL to a location on site 101. In step 130, the agent closes table cells as appropriate, and in step 132 handles any special case(s) that may need to be added. In step 134, all of this data 115, 118 is moved and saved to a field 116, 118 on the appropriate form 102, 104 for display.

Table 4 sets forth the agent code for the create map procedure of the preferred embodiment of the invention, as described above with respect to FIG. 2.

TABLE 4

CREATE MAP AGENT

```
1   Sub Initialize
2       Dim session As New notessession
3       Dim db As notesdatabase
4       Dim view As notesview
5       Dim doc As notesdocument
6       Dim doc2 As notesdocument
7       Dim dc As notesdocumentcollection
8       Dim mainview As NotesView
9
10      Set db = session.currentdatabase
11      Set doc2 = session.documentcontext
12
13      If doc2.MapType(0) = "sitemap" Then
14          tablestart = "[<TABLE CELLSPACING=1 CELLPADDING=0
15          BORDER=1>]"
16          tableend = "[</TABLE>]"
17          cellstart = "[<TD ALIGN=LEFT VALIGN=TOP><img
18          src=""/cons/home/spacer.gif"" width=130 height=1
19          border=0>]"
20          cellend = "[</TD>]"
21      Else
22          tablestart = ""
23          tableend = ""
24          cellstart = ""
25          cellend = ""
26      End If
27
28      Set mainview = db.GetView("layerMap")
29      Set doc = mainview.getfirstdocument
30      category = ""
31      sub_category = ""
32      maincatnum = 0
33
34      While Not doc Is Nothing
35          If category <> doc.Category_Name(0) Then
36              category = doc.Category_Name(0)
37              Select Case Lcase(category)
38              Case "refs"
39                  viewtitle = "Our Customers"
40                  viewurl =
41                  "/home.nsf/references?OpenView"
42              Case "e-biz"
43                  viewtitle = "e-business Essentials"
44                  viewurl = "/essentials"
45              Case "presentations"
46                  viewtitle = "Presentations"
47                  viewurl =
48                  "/home.nsf/presentations?OpenView"
49              Case "news"
50                  viewtitle = "News"
51                  viewurl = "news"
52              Case "geographies"
53                  viewtitle = "Geographies"
54                  viewurl = "/home.nsf/ebusgeo?openview"
55              Case "comp"
56                  viewtitle = "Competition"
57                  viewurl =
58                  "/home.nsf/competition?OpenView"
59              Case "salesres"
60                  viewtitle = "More Resources"
61                  viewurl =
62                  "/home.nsf/Sales+Resources?OpenView"
63              Case "ebkb"
64                  viewtitle = "e-business Value
65                  Knowledgebase"
66                  viewurl = "/knowledgebase.nsf"
67              End Select
68              If maincatnum = 0 Then
69                  DisplayField = DisplayField + tablestart
70              Else
71                  DisplayField = DisplayField + cellend
72              End If
```

TABLE 4-continued

CREATE MAP AGENT

```
73                              maincatnum = maincatnum + 1
74                              DisplayField = DisplayField + cellstart +
75                              "[</ul><p></font><font size=4><a href=" +
76                              viewurl + ">" + viewtitle + "</a></font><font
77                              size=-1><ul>]"
78                              sub_category = doc.SubCategory(0)
79                              catnum = 0
80                              If sub_category <> "" Then
81                                      If doc2.MapType(0) = "sitemap" Then
82                                              catnum = catnum + 1
83                                              url = viewurl + "&Expand=" +
84                                              Cstr(catnum) + "#" + Cstr(catnum)
85                                              DisplayField = DisplayField +
86                                              {[</ul><li><a href="} + url + {">]}
87                                              + sub_category + {[</a><ul>]}
88                                      Else
89                                              DisplayField = DisplayField +
90                                              "[</ul><li><b>]" + sub_category +
91                                              "[</b><ul>]"
92                                              DisplayField = DisplayField +
93                                              "[<li>]" + doc.Title(0)
94                                      End If
95                              Else
96                                      DisplayField = DisplayField + "[<li>]" +
97                                      doc.Title (0)
98                              End If
99                      Else
100                             If sub_category <> doc.SubCategory(0) Then
101                                     sub_category = doc.SubCategory(0)
102                                     If doc2.MapType(0) = "sitemap" Then
103                                             catnum = catnum + 1
104                                             url = viewurl + "&Expand=" +
105                                             Cstr(catnum) + "#" + Cstr(catnum)
106                                             DisplayField = DisplayField +
107                                             {[</ul><li><a href="} + url + {">]}
108                                             + sub_category + {[</a><ul>]}
109                                     Else
110                                             DisplayField = DisplayField +
111                                             "[</ul><li><b>]" + sub_category +
112                                             "[</b><ul>]"
113                                             DisplayField = DisplayField +
114                                             "[<li>]" + doc.Title(0)
115                                     End If
116                             Else
117                                     If sub_category = "" Then
118                                             DisplayField = DisplayField +
119                                             "[<li>]" + doc.Title(0)
120                                     Else
121                                             If doc2.MapType(0) = "toc" Then
122                                                     DisplayField = DisplayField +
123                                                     "[<li>]" + doc.Title(0)
124                                             End If
125                                     End If
126                             End If
127                     End If
128
129             Set doc = mainview.getnextdocument (doc)
130     Wend
131
132     'Handle Priority Offerings (Solutions) SPECIAL
133
134     'Priority Offerings (Solutions)
135     viewurl = "/home.nsf/globale-bussol?ReadForm"
136     viewtitle = "Solutions"
137     solutions = "[</ul><p></font><font size=4><a href=" +
138     viewurl + ">" + viewtitle + "</a></font><font size=-
139     1><ul>]"
140     DisplayField = DisplayField + cellend + cellstart +
141     solutions
142     'e-commerce
143     viewurl = "/ecomm.nsf/ECOMhome?ReadForm"
144     viewtitle = "E-commerce"
145     ecomm = {[<li><a href="} + viewurl + {">]} + viewtitle
146     + {[</a>]}
147     DisplayField = DisplayField + ecomm
148     'ERP
149     viewurl = "/erp"
```

TABLE 4-continued

CREATE MAP AGENT

```
150         viewtitle = "ERP"
151         erp = {[<li><a href="} + viewurl + {">]} + viewtitle +
152         {[</a>]}
153         DisplayField = DisplayField + erp
154
155         DisplayField = DisplayField + "[</font></ul></ul>]" +
156         cellend + tableend
157         Call doc2.ReplaceItemValue ("DisplayMap",DisplayField)
158
159  End Sub
```

Advantages Over the Prior Art

It is an advantage of the invention that there is provided an improved site map and table of contents for a web page.

It is an advantage of the invention that there is provided a system and method for providing dynamic updating of a web page site map and table of contents.

It is an advantage of the invention that there is provided a system and method enabling a dynamically updated web page site map and table of contents to link directly with volatile content.

It is an advantage of the invention that there is provided a system and a method enabling browser linking of site content to the site map and table of contents.

Alternative Embodiments

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as an IBM System 390, AS/400, PC or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

I claim:

1. A method for displaying from a web site a site view selectively including a site map and a table of contents, comprising the steps of:

organizing a site as a collection of topical content areas in a content database, each said area containing a list of content items that a user can link to for display using views;

providing a site navigation view as an index on said content database, said index being dynamically updated whenever additions and deletions of area category or content items are made to said content database;

providing a site view layout structure including an HTML table structure and an HTML list structure for populating fields respectively in said site map and said table of contents;

providing a site view as a category oriented view;

responsive to a user request for display of said site view, executing an agent to access said site navigation view to obtain and display to said user current area category and content items from said content database by responsive to said user request being for a site map, setting up an initial table structure;

examining said site navigation view to identify navigational content for said site sorted by category;

processing each document in order of appearance in said site navigation view and building an HTML page containing bulleted lists of links separated by category names identified in said content by reading a first document, setting a first category name as that category identified in said first document, for a user request for a site map, initializing said table structure with said first document, and starting a bulleted list with an HTML link created selectively pointing to said first document or to another location on said site if such other location is defined by link information in said first document;

checking a subcategory structure and, for a user request for a site map, starting a sub-bulleted list with an HTML link to a subcategory page, and, for a user request for a table of contents, a name of said subcategory;

reading a next document, responsive to said next document having a next category name different from prior documents, closing said bulleted list and adding said next category name to said HTML page and starting a new bulleted list;

responsive to said next category name being within a prior category name, checking said subcategory structure;

responsive to a subcategory name of this next document being different from a prior subcategory name of a prior document, closing said sub-bulleted list and starting a new sub-bulleted list with an HTML link to a subcategory page for a site map or just a name of this subcategory for a table of contents;

creating an HTML link selectively pointing to said next document or to another location on said site if such other location is defined in said next document, and repeating said reading a next document step for all documents in said view; and then closing said bulleted list and saving said HTML page for presentation to said user;

providing in a site map form a tabular layout structure for said site map including a first title, header and footer fields pulled in from said web site, a form type identifier, and a first data field for receiving site map data from said agent responsive to a user request; and providing in a table of contents form a column layout structure for said table of contents including a second title, header and footer fields pulled in from said web site, a form type identifier, and a second data field for receiving table of contents data from said create map agent responsive to a user request;

said site map form and said table of contents form providing respective data fields for receiving data from said agent dynamically responsive to a request from a user for display of said site map or said table of contents.

2. System for displaying from a web site a site view selectively including a site map and a table of contents, comprising:

means for organizing a site as a collection of topical content areas, each said area containing a list of content items that a user can link to for display using views;

means for providing a site navigation view as an index on said content database, said index being updated whenever additions and deletions of area category or content items are made to said content database;

means for providing a site view layout structure including an HTML table structure and an HTML list structure for populating fields respectively in said site map and said table of contents; means for providing a site view as a category oriented view; and means responsive to a user request for display of said site view, for executing an agent to access said site navigation view to obtain and display to said user current area category and content items from said content database; by responsive to said user request being for a site map, setting up an initial table structure;

examining said site navigation view to identify navigational content for said site sorted by category;

processing each document in order of appearance in said site navigation view and building an HTML page containing bulleted lists of links separated by category names identified in said content by reading a first document, setting a first category name as that category identified in said first document, for a user request for a site map, initializing said table structure with said first document, and starting a bulleted list with an HTML link created selectively pointing to said first document or to another location on said site if such other location is defined by link information in said first document;

checking a subcategory structure and, for a user request for a site map, starting a sub-bulleted list with an HTML link to a subcategory page, and, for a user request for a table of contents, a name of said subcategory;

reading a next document, responsive to said next document having a next category name different from prior documents, closing said bulleted list and adding said next category name to said HTML page and starting a new bulleted list;

responsive to said next category name being within a prior category name, checking said subcategory structure;

responsive to a subcategory name of this next document being different from a prior subcategory name of a prior document, closing said sub-bulleted list and starting a new sub-bulleted list with an HTML link to a subcategory page for a site map or just a name of this subcategory for a table of contents;

creating an HTML link selectively pointing to said next document or to another location on said site if such other location is defined in said next document, and repeating said reading a next document step for all documents in said view; and then closing said bulleted list and saving said HTML page for presentation to said user;

means for providing in a site map form a tabular layout structure for said site map including a first title, header and footer fields pulled in from said web site, a form type identifier, and a first data field for receiving site map data from said agent responsive to a user request; and means for providing in a table of contents form a column layout structure for said table of contents including a second title, header and footer fields pulled in from said web site, a form type identifier, and a second data field for receiving table of contents data from said create map agent responsive to a user request;

said site map form and said table of contents form providing respective data fields for receiving data from said agent dynamically responsive to a request from a user for display of said site map or said table of contents.

3. A program storage device readable by a machine, tangibly embodying a program of instructions executable by a machine to perform method steps for displaying from a web site a site view selectively including a site map and a table of contents, said method steps comprising:

organizing a site as a collection of topical content areas in a content database, each said area containing a list of content items that a user can link to for display using views;

providing a site navigation view as an index on said content database, said index being updated whenever additions and deletions of area category or content items are made to said content database;

providing a site view layout structure including an HTML table structure and an HTML list structure for populating fields respectively in said site map and said table of contents;

providing a site view as a category oriented view; and responsive to a user request for display of said site view, executing an agent to access said site navigation view to obtain and display to said user current area category and content items from said content database; by responsive to said user request being for a site map, setting up an initial table structure;

examining said site navigation view to identify navigational content for said site sorted by category;

processing each document in order of appearance in said site navigation view and building an HTML page containing bulleted lists of links separated by
category names identified in said content by
 reading a first document,
  setting a first category name as that category identified in said first document,
  for a user request for a site man, initializing said table structure with said first document, and
  starting a bulleted list with an HTML link created selectively pointing to said first document or to another location on said site if such other location is defined by link information in said first document;
  checking a subcategory structure and, for a user request for a site map, starting a sub-bulleted list with an HTML link to a subcategory page, and, for a user request for a table of contents, a name of said subcategory;
 reading a next document,
  responsive to said next document having a next category name different from prior documents, closing said bulleted list and adding said next category name to said HTML page and starting a new bulleted list;
  responsive to said next category name being within a prior category name, checking said subcategory structure;
  responsive to a subcategory name of this next document being different from a prior subcategory name of a prior document, closing said sub-bulleted list and starting a new sub-bulleted list with an HTML link to a subcategory page for a site map or just a name of this subcategory for a table of contents;
  creating an HTML link selectively pointing to said next document or to another location on said site if such other location is defined in said next document, and
  repeating said reading a next document step for all documents in said view; and then
  closing said bulleted list and saving said HTML page for presentation to said user;
 providing in a site map form a tabular layout structure for said site map including a first title, header and footer fields pulled in from said web site, a form type identifier, and a first data field for receiving site map data from said agent responsive to a user request; and
 providing in a table of contents form a column layout structure for said table of contents including a second title, header and footer fields pulled in from said web site, a form type identifier, and a second data field for receiving table of contents data from said create map agent responsive to a user request;
 said site map form and said table of contents form providing respective data fields for receiving data from said agent dynamically responsive to a request from a user for display of said site map or said table of contents.

4. A system for displaying from a web site a site view selectively including a site map and a table of contents, comprising:
 a content database for storing a plurality of documents;
 a site view layout structure including an HTML table structure and an HTML list structure for populating fields respectively in said site map and said table of contents;
 a site navigation view for indexing area category and content items in said content database, said index being updated whenever additions and deletions of area category and content items are made to said content database;
 a user browser;
 a create map agent for accessing said site navigation view to identify documents in said content database and extract to said site view layout structure data for presentation in fields of said site view; by
  responsive to said user request being for a site map, setting up an initial table structure;
  examining said site navigation view to identify navigational content for said site sorted by category;
  processing each document in order of appearance in said site navigation view and building an HTML page containing bulleted lists of links separated by category names identified in said content by
   reading a first document,
    setting a first category name as that category identified in said first document,
    for a user request for a site map, initializing said table structure with said first document, and
    starting a bulleted list with an HTML link created selectively pointing to said first document or to another location on said site if such other location is defined by link information in said first document;
    checking a subcategory structure and, for a user request for a site map, starting a sub-bulleted list with an HTML link to a subcategory page, and, for a user request for a table of contents, a name of said subcategory;
   reading a next document,
    responsive to said next document having a next category name different from prior documents, closing said bulleted list and adding said next category name to said HTML page and starting a new bulleted list;
    responsive to said next category name being within a prior category name, checking said subcategory structure;
    responsive to a subcategory name of this next document being different from a prior subcategory name of a prior document, closing said sub-bulleted list and starting a new sub-bulleted list with an HTML link to a subcategory page for a site map or just a name of this subcategory for a table of contents;
    creating an HTML link selectively pointing to said next document or to another location on said site if such other location is defined in said next document, and
    repeating said reading a next document step for all documents in said view; and then
    closing said bulleted list and saving said HTML page for presentation to said user;
 a site map form for providing a tabular layout structure for said site map including a first title, header and footer fields pulled in from said web site, a form type identifier, and a first data field for receiving site map data from said create map agent responsive to a user request;
 a table of contents form for providing a column layout structure for said table of contents including a second title, header and footer fields pulled in from said web site, a form type identifier, and a second data field for receiving table of contents data from said create map agent responsive to a user request;

said site map form and said table of contents form providing respective data fields for receiving data from said create map agent dynamically responsive to a request from a user for display of said site map or said table of contents.

5. Method for displaying from a web site a site view selectively including a site map and a table of contents, comprising the steps of:

providing a site navigation view as an index on a content database, said index being updated whenever additions and deletions of area category or content items are made to said content database;

executing an agent responsive to a user request for a display of said site view, for setting up a site view layout structure including an HTML table structure and an HTML list structure for populating fields respectively in said site map and said table of contents; identifying in said navigation view one or more navigation documents; for each navigation document identified, determining the category name and adding a list item for said category to said site view layout structure including:

responsive to said user request being for a site map, setting up an initial table structure;

examining said site navigation view to identify navigational content for said site sorted by category;

processing each document in order of appearance in said site navigation view and building an HTML page containing bulleted lists of links separated by category names identified in said content by reading a first document, setting a first category name as that category identified in said first document, for a user request for a site map, initializing said table structure with said first document, and starting a bulleted list with an HTML link created selectively pointing to said first document or to another location on said site if such other location is defined by link information in said first document;

checking a subcategory structure and, for a user request for a site map, starting a sub-bulleted list with an HTML link to a subcategory page, and, for a user request for a table of contents, a name of said subcategory;

reading a next document, responsive to said next document having a next category name different from prior documents, closing said bulleted list and adding said next category name to said HTML page and starting a new bulleted list;

responsive to said next category name being within a prior category name, checking said subcategory structure;

responsive to a subcategory name of this next document being different from a prior subcategory name of a prior document, closing said sub-bulleted list and starting a new sub-bulleted list with an HTML link to a subcategory page for a site map or just a name of this subcategory for a table of contents;

creating an HTML link selectively pointing to said next document or to another location on said site if such other location is defined in said next document, and repeating said reading a next document step for all documents in said view; and then closing said bulleted list and saving said HTML page for presentation to said user;

copying each said list item from said layout structure to said site view for display of said area category or content items in said navigation documents indexed by said navigation view responsive to said user request;

providing in a site map form a tabular layout structure for said site map including a first title, header and footer fields pulled in from said web site, a form type identifier, and a first data field for receiving site map data from said agent responsive to a user request;

providing in a table of contents form a column layout structure for said table of contents including a second title, header and footer fields pulled in from said web site, a form type identifier, and a second data field for receiving table of contents data from said create map agent responsive to a user request; and said site map form and said table of contents form providing respective data fields for receiving data from said agent dynamically responsive to a request from a user for display of said site map or said table of contents.

6. An article of manufacture comprising:

a computer useable medium having computer readable program code means embodied therein for displaying from a web site a site view selectively including a site map and a table of contents, the computer readable program means in said article of manufacture comprising:

computer readable program code means for causing a computer to effect organizing a site as a collection of topical content areas in a content database, each said area containing a list of content items that a user can link to for display using views;

computer readable program code means for providing a site navigation view as an index on said content is database, said index being updated whenever additions and deletions of area category or content items are made to said topical content areas;

computer readable program code means for providing a site view layout structure including an HTML table structure and an HTML list structure for populating fields respectively in said site map and said table of contents;

computer readable program code means for causing a computer to effect providing a site view as a category oriented view;

computer readable program code means for providing in a site map form a tabular layout structure for said site map including a first title, header and footer fields pulled in from said web site, a form type identifier, and a first data field for receiving site map data from an agent responsive to a user request; said agent:

responsive to said user request being for a site map, setting up an initial table structure;

examining said site navigation view to identify navigational content for said site sorted by category;

processing each document in order of appearance in said site navigation view and building an HTML page containing bulleted lists of links separated by category names identified in said content by reading a first document, setting a first category name as that category identified in said first document, for a user request for a site man, initializing said table structure with said first document, and starting a bulleted list with an HTML link created selectively pointing to said first document or to another location on said site if such other location is defined by link information in said first document;

checking a subcategory structure and, for a user request for a site map, starting a sub-bulleted list with an HTML link to a subcategory page, and, for a user request for a table of contents; a name of said subcategory;

reading a next document, responsive to said next document having a next category name different from prior documents, closing said bulleted list and adding said next category name to said HTML page and starting a new bulleted list;

responsive to said next category name being within a prior category name, checking said subcategory structure;

responsive to a subcategory name of this next document being different from a prior subcategory name of a prior document, closing said sub-bulleted list and starting a new sub-bulleted list with an HTML link to a subcategory pare for a site map or just a name of this subcategory for a table of contents;

creating an HTML link selectively pointing to said next document or to another location on said site if such other location is defined in said next document, and repeating said reading a next document step for all documents in said view; and then closing said bulleted list and saving said HTML save for presentation to said user;

computer readable program code means for providing in a table of contents form a column layout structure for said table of contents including a second title, header and footer fields pulled in from said web site, a form type identifier, and a second data field for receiving table of contents data from said create map agent responsive to a user request;

said site map form and said table of contents form providing respective data fields for receiving data from said agent dynamically responsive to a request from a user for display of said site map or said table of contents; and computer readable program code means for causing a computer to effect, responsive to a user request for display of said site view, executing an agent to access said site navigation view to obtain and display to said user current area category and content items from said content database.

7. A computer program product or computer program element for displaying from a web site a site view selectively including a site map and a table of contents according to the steps of:

organizing a site as a collection of topical content areas, each said area containing a list of content items that a user can link to for display using views; providing a site navigation view as an index on said content database, said index being updated whenever additions and deletions of area category or content items are made to said content database;

providing a site view layout structure including an HTML table structure and an HTML list structure for populating fields respectively in said site map and said table of contents;

providing a site view as a category oriented view;

providing an agent for:

responsive to said user request being for a site, map, setting up an initial table structure;

examining said site navigation view to identify navigational content for said site sorted by category;

processing each document in order of appearance in said site navigation view and building an HTML page containing bulleted lists of links separated by category names identified in said content by reading a first document, setting a first category name as that category identified in said first document, for a user request for a site map, initializing said table structure with said first document, and starting a bulleted list with an HTML link created selectively pointing to said first document or to another location on said site if such other location is defined by link information in said first document;

checking a subcategory structure and, for a user request for a site map, starting a sub-bulleted list with an HTML link to a subcategory page, and, for a user request for a table of contents, a name of said subcategory;

reading a next document, responsive to said next document having a next category name different from prior documents, closing said bulleted list and adding said next category name to said HTML page and starting a new bulleted list;

responsive to said next category name being within a prior category name, checking said subcategory structure;

responsive to a subcategory name of this next document being different from a prior subcategory name of a prior document, closing said sub-bulleted list and starting a new sub-bulleted list with an HTML link to a subcategory page for a site man or just a name of this subcategory for a table of contents;

creating an HTML link selectively pointing to said next document or to another location on said site if such other location is defined in said next document, and repeating said reading a next document step for all documents in said view; and then closing said bulleted list and saving said HTML page for presentation to said user;

providing in a site map form a tabular layout structure for said site map including a first title, header and footer fields pulled in from said web site, a form type identifier, and a first data field for receiving site map data from said agent responsive to a user request;

providing in a table of contents form a column layout structure for said table of contents including a second title, header and footer fields pulled in from said web site, a form type identifier, and a second data field for receiving table of contents data from said create map agent responsive to a user request;

said site map form and said table of contents form providing respective data fields for receiving data from said agent dynamically responsive to a request from a user for display of said site map or said table of contents; and responsive to a user request for display of said site view, executing an agent to access said index of said site navigation view to obtain and display to said user most current area category and content items.

* * * * *